United States Patent Office 3,096,302
Patented July 2, 1963

3,096,302
HEAT AND LIGHT STABLE POLYPROPYLENE
COMPOSITIONS
Gordon C. Newland, Kingsport, Tenn., and Julian H. Chaudet, Fairfax, Va., assignors to Eastman Kodak Company, Rochester, N.Y., a corporation of New Jersey
No Drawing. Filed Sept. 13, 1961, Ser. No. 137,748
4 Claims. (Cl. 260—45.95)

This invention relates to plastic compositions. More particularly, it relates to polypropylene plastic compositions stabilized relative to the effects of heat and light.

Normally solid polypropylene has poor resistance to thermal oxidation even at relatively low temperatures. For instance, stressed samples of an unstabilized polypropylene have developed cracks when stored at 110° C. for 20 hours.

In addition, normally solid polypropylene undergoes photochemical degradation when exposed to sunlight, particularly ultraviolet light, and air. This effect is frequently termed weathering. It appears to be a photooxidation process which causes rupture of the polymer chains and formation of carbonyl groups. As it progresses, articles manufactured from polypropylene tend to crack, become brittle and lose tensile strength to the extent of mechanical failure.

A general object of this invention is to provide a polypropylene composition which is stabilized relative to the degradation effects of heat and light.

A specific object of this invention is to provide a polypropylene plastic composition comprising an additive highly effective to stabilize the polypropylene polymer against degradation by thermal oxidation and by ultraviolet light.

These objects and others are achieved by this invention which is based on our discovery that 2-hydroxy-4,4'-didodecyloxybenzophenone is a highly effective heat and light stabilizer for polypropylene.

In summary, this invention comprises a polypropylene plastic composition consisting essentially of the admixture of (1) a normally solid polypropylene polymer component and (2) a stabilizing quantity of the compound 2-hydroxy-4,4'-didodecyloxybenzophenone.

The polypropylene polymer component consists essentially of a normally solid polymer of propylene. In general this polymer is thermoplastic with a consistency at room temperature ranging from wax-like to hard depending on the molecular weight and mode of synthesis of the particular polymer involved.

The stabilizer of this invention, namely, 2-hydroxy-4,4'-didodecyloxybenzophenone, can be easily prepared from readily available materials. One process for making this compound basically involves refluxing 1-bromododecane and 2,4,4'-trihydroxybenzophenone at a mole ratio of at least about 2:1 in the presence of potassium carbonate and acetone. The 2,4,4'-trihydroxybenzophenone can be prepared according to Example 5 of the U.S. Patent No. 2,925,401, to Newland et al.

Concentration of the 2-hydroxy-4,4'-didodecyloxybenzophenone in the polypropylene compositions of this invention is selected in accordance with the degree of stabilization desired. In general satisfactory results are obtained with the concentration at about 0.1–5 weight percent of the composition.

The plastic composition of this invention is prepared by incorporating the 2-hydroxy-4,4'-didodecyloxybenzophenone into the polypropylene polymeric component. Generally such incorporation is performed by any one of a number of well-known methods, such as roll-compounding, extrusion, solvent mixing, etc. For example, such incorporation can be performed by heating or otherwise softening the polypropylene polymeric component to a workable consistency and then working in the 2-hydroxy-4,4'-didodecyloxybenzophenone until a substantially uniform mixture or dispersion is obtained. The resulting polypropylene plastic composition is then cast or molded into any desired shape, for example, pellets, sheeting, film, bars, articles and the like, as by conventional casting and molding techniques which include extrusion, blow molding and the like.

This invention is further illustrated by the following examples of various aspects thereof. Unless otherwise indicated this invention is not limited to the specific embodiments of this invention included in the examples.

EXAMPLE I

This example illustrates a polypropylene plastic composition of this invention and a process for its preparation.

A sample of a batch of polypropylene having a melt index of 7, an inherent viscosity of 1.2–1.5 and an ash content of 0.01 percent by weight was obtained. Incorporated into this sample was 2-hydroxy-4,4'-didodecyloxybenzophenone at a concentration of 1 percent by weight of the composition. Incorporation was accomplished by hot roll-compounding the mixture of polypropylene and 2-hydroxy-4,4'-didodecyloxybenzophenone for four minutes.

EXAMPLE II

This example illustrates on a comparative basis the thermal stability of the polypropylene plastic composition of Example I.

Four additional samples of the polypropylene used in Example I were obtained. Incorporated as in Example I into three of the samples were the additives indicated in the following Table 1, the additive concentration in the composition in each case being 1 weight percent. No additive was incorporated into the fourth sample. However, it was otherwise treated as the other three samples and the polypropylene composition of Example I.

These four compositions and the polypropylene plastic composition of Example I were granulated and then injection molded into tensile bars $\frac{1}{16}$-inch thick and 2½-inches long.

Two tensile bars of each composition were bent U-shaped and while bent the ends were mounted into a channel $\frac{5}{8}$ inch and ½ inch deep. This channel with the thus stressed bars was stored in a mechanical convection oven maintained at 90° C. Another channel with a similar set of stressed bars was stored in a mechanical convection oven maintained at 110° C. Still another channel with a similar set of stressed bars of each polypropylene composition was stored in a conventional oven at 70° C. Periodic observations of these channels were made for the purpose of determining stress cracking life of each polypropylene composition. By definition the stress cracking life of a polypropylene composition was taken as the average number of storage hours required to develop cracks in both bars of the composition. The stress cracking life of these polypropylene compositions are recorded in Table 1.

*Table 1*

| Additive | Oven Stress-Cracking Life in Hours | | |
|---|---|---|---|
| | 70° C. | 90° C. | 110° C. |
| None | 190 | 78 | 20 |
| 2-hydroxy-4,4'-Dimethoxybenzophenone | 455 | 274 | 22 |
| 2,2'-Dihydroxybenzophenone | 622 | 280 | 22 |
| 2-Hydroxy-5-Methoxybenzophenone | 3,322 | 2,000 | 120 |
| 2-Hydroxy-4-Dodecyloxybenzophenone | >10,500 | 6,800 | 387 |
| 2-Hydroxy-4,4'-Didodecyloxybenzophenone | >10,500 | >10,500 | >10,500 |

This demonstrates in striking fashion the superior thermal stability achieved by the polypropylene plastic composition of Example I.

EXAMPLE III

This example illustrates on a comparative basis the light stability of the polypropylene plastic composition of Example I.

From the lot of tensile bars described in Example II, four tensile bars of each polypropylene composition were bent U-shaped and while bent the ends were mounted in a channel ⅝ inch wide and ½ inch deep. The channel was placed outdoors in Kingsport, Tennessee, commencing in early summer, whereby the stressed tensile bars were exposed to sunlight and air. The time in days required for stress cracks to develop in two of the four exposed bars of each composition are recorded in Table 2 as the outdoor stress-cracking life.

*Table 2*

| Additive: | Outdoor stress-cracking life in days |
|---|---|
| None | 18 |
| 2,2'-dihydroxybenzophenone | 61 |
| 2-hydroxy-5-methoxybenzophenone | 87 |
| 2-hydroxy-4-dodecyloxybenzophenone | 87 |
| 2-hydroxy-4,4'-dimethoxybenzophenone | 137 |
| 2-hydroxy-4,4'-didodecyloxybenzophenone | 100 |

Hence, 2-hydroxy-4,4'-didodecyloxybenzophenone functions as a good ultraviolet light stabilizer for the polypropylene of Example I.

In none of this test work was exudation of the stabilizer from the plastic composition observed. Indeed, 2-hydroxy-4,4'-didodecyloxybenzophenone is compatible with normally solid polypropylene at a concentration in the plastic composition of about 0.1–3 weight percent.

Thus, there is provided a polypropylene plastic composition having improved thermal oxidation stability and satisfactory ultraviolet radiation stability.

A surprising feature of advantage of the polypropylene plastic composition of this invention is its long oven life compared to the oven lives of other polypropylene plastic compositions comprising other 2-hydroxybenzophenones.

Other features, advantages and embodiments of this invention will occur to those in the exercise of ordinary skill in the art in reading the foregoing disclosure. All embodiments of this invention including variations and modifications thereof embracing the spirit and essential characteristics of this invention are included within the scope of the claimed subject matter unless expressly excluded by claim language.

We claim:

1. A heat and light stable polypropylene plastic composition comprising: a normally solid polypropylene polymer component and dispersed therein 4,4'-didodecyloxy-2-hydroxybenzophenone at a heat and light stabilizing concentration.

2. A heat and light stable polypropylene plastic composition comprising: a normally solid polypropylene polymer component and dispersed therein 4,4'-didodecyloxy-2-hydroxybenzophenone at a concentration of about 0.1–5 percent by weight of the composition.

3. A heat and light stable polypropylene plastic composition comprising: a normally solid polypropylene polymer component and dispersed therein 4,4'-didodecyloxy-2-hydroxybenzophenone at a concentration of about 0.1–3 percent by weight of the composition.

4. A process for making a heat and light stable polypropylene plastic composition, which comprises incorporating into a normally solid polypropylene polymer a protective quantity of 4,4'-didodecyloxy-2-hydroxybenzophenone.

References Cited in the file of this patent
UNITED STATES PATENTS
3,006,959    Armitage et al. _____ Oct. 31, 1961